United States Patent [19]
Fassler et al.

[11] Patent Number: 6,031,586
[45] Date of Patent: Feb. 29, 2000

[54] LIQUID CRYSTAL PRINTING APPARATUS FOR RADIATION THERMAL TRANSFER OF COLORANT FROM A DONOR TO A RECEIVER

[75] Inventors: Werner Fassler, Rochester; Charles D. DeBoer, Palmyra; James E. Pickering, Bloomfield, all of N.Y.

[73] Assignee: Eastman Kodak Company, Rochester, N.Y.

[21] Appl. No.: 08/987,663

[22] Filed: Dec. 9, 1997

[51] Int. Cl.[7] .............................. G02F 1/13; G03G 13/01; B41M 5/20
[52] U.S. Cl. .................................. 349/3; 349/2; 430/47; 503/227; 347/238; 347/248
[58] Field of Search .............................. 349/2, 3; 430/47; 503/227; 347/238, 248

[56] References Cited

U.S. PATENT DOCUMENTS

| | | | |
|---|---|---|---|
| 4,486,760 | 12/1984 | Funada et al. | 346/107 R |
| 4,595,259 | 6/1986 | Perregaux | 349/3 |
| 4,605,972 | 8/1986 | Hatanaka | 346/160 |
| 4,764,444 | 8/1988 | Simons et al. | 430/47 |
| 4,820,062 | 4/1989 | Shirane | 384/486 |
| 4,884,079 | 11/1989 | Inoue et al. | 349/3 |
| 4,975,410 | 12/1990 | Weber et al. | 503/227 |
| 5,095,376 | 3/1992 | Umeda et al. | 359/56 |
| 5,191,358 | 3/1993 | Iwasaki | 349/3 |
| 5,295,006 | 3/1994 | Lee | 349/3 |
| 5,914,744 | 6/1999 | Ng | 347/237 |

*Primary Examiner*—William L. Sikes
*Assistant Examiner*—Tarifur R. Choudhury
*Attorney, Agent, or Firm*—Raymond L. Owens

[57] ABSTRACT

Printing apparatus for radiation thermal transfer of colorant from a donor to a receiver, including a flash tube for emitting high intensity radiation; a polarizer for receiving high intensity radiation from the flash tube and polarizing such radiation; and liquid crystal cells disposed to receive polarized radiation from the polarizer. Electrodes modulate the liquid crystal cells so that they change the polarization of the radiation passing through them. A second polarizer receives radiation from the liquid crystal cells and is arranged to pass different intensities of radiation depending on their polarization. The colorant donor and the receiver are positioned in colorant transfer relationship with the second polarizer at a colorant transfer position so that radiation which passes through the second polarizer illuminates the colorant donor so that colorant is transferred to the receiver.

8 Claims, 3 Drawing Sheets

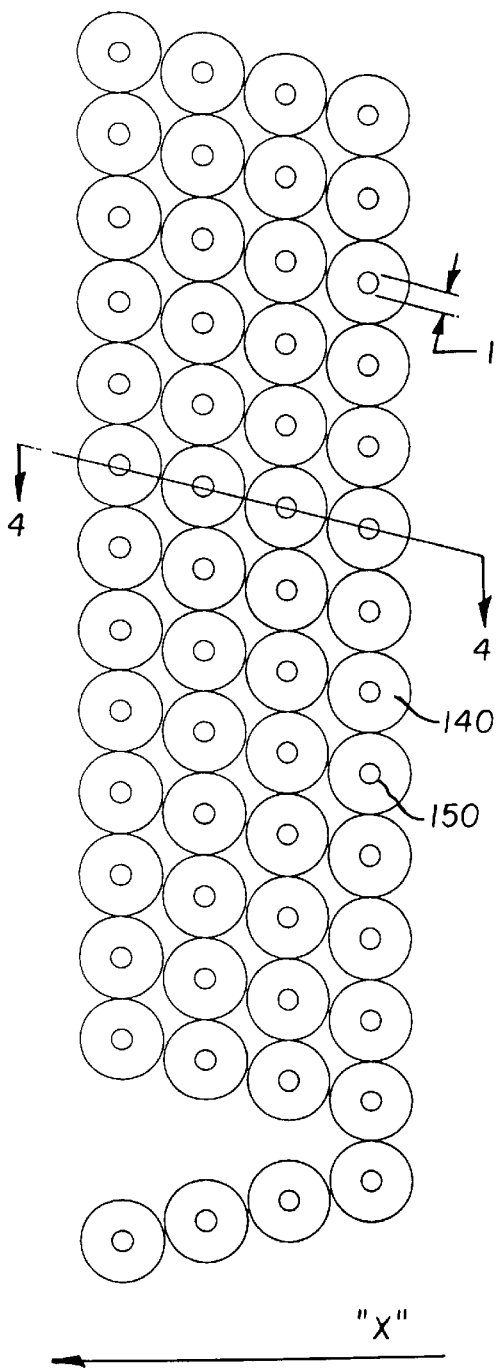
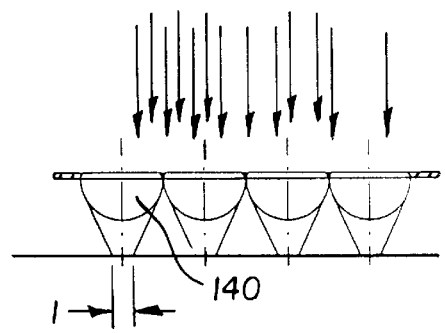
FIG. 4
FIG. 3

LIQUID CRYSTAL PRINTING APPARATUS FOR RADIATION THERMAL TRANSFER OF COLORANT FROM A DONOR TO A RECEIVER

FIELD OF THE INVENTION

The present invention relates to printing apparatus which transfers colorant from a donor to a receiver.

BACKGROUND OF THE INVENTION

It is known to use liquid crystal devices as radiation modulation elements in printing devices, as signal reading devices, signal converting devices, radiation signal switches, devices for adjusting the quantity of radiation, or as radiation valves. U.S. Pat. No. 4,820,062 describes a high speed liquid crystal printer for silver halide prints, in which high speed switching is achieved by the phenomenon of dielectric relaxation. U.S. Pat. No. 5,095,376 describes a high speed liquid crystal printer for silver halide prints in which a ferroelectric liquid crystal is driven by a series of 4 electrical signals to improve contrast. U.S. Pat. No. 4,486,760 describes a silver halide printer in which a liquid crystal cell is equipped with optical fibers oriented to provide increased contrast of the signal. U.S. Pat. No. 4,605,972 describes a liquid crystal printer for silver halide prints in which a pulse width modulation driving scheme is used to achieve accurate tone scale.

Radiation thermal transfer of dyes to produce a color filter array is described in U.S. Pat. No. 4,975,410. An intense flash of radiation is modulated by a reflective chrome mask with clear openings where dye transfer is desired. The radiation is absorbed by a colorant donor sheet containing a radiation absorber along with the dye. The heat generated by the absorption of radiation causes the dye to transfer, presumably by sublimation, from the donor sheet to a receiver. No processing or development of the dye image is needed in thermal dye transfer, unlike silver halide photographic imaging.

U.S. Pat. No. 4,764,444 describes a thermal dye transfer printing element in which an image mask is created by an electrographic or photothermographic means, following which a radiation flash is used to thermally transfer dye to a receiver in un-masked image areas. The creation of such image masks is, in general, slow and cumbersome.

SUMMARY OF THE INVENTION

It is an object of the present invention to provide printing apparatus which can efficiently transfer colorant from a donor to a receiver and does not require the expensive and tedious preparation of a mask for each image.

It is the object of this invention to provide a printing apparatus for radiation thermal transfer of colorant from a donor to a receiver, comprising:

a) a flash tube for emitting high intensity radiation;

b) a polarizer for receiving high intensity radiation from the flash tube and polarizing such radiation;

c) liquid crystal cells disposed to receive polarized radiation from the polarizer;

d) means for modulating the liquid crystal cells so that they change the polarization of the radiation passing through them;

e) a second polarizer for receiving radiation from the liquid crystal cells and arranged to pass different intensities of radiation depending on their polarization; and f) means for positioning the colorant donor and the receiver in colorant transfer relationship with the second polarizer at a colorant transfer position so that radiation which passes through the second polarizer illuminates the colorant donor so that colorant is transferred to the receiver.

ADVANTAGES

An advantage of this invention is that the printing is dry and requires no processing.

Another advantage is that the printing is high quality both in sharpness and color.

Another advantage is that the printing is fast.

BRIEF DESCRIPTION OF THE DRAWINGS

FIG. 3 is a top view showing a microlens array which can be used in a second embodiment of the invention;

FIG. 4 is a side view of the microlens array of FIG. 3; and

DETAILED DESCRIPTION OF THE INVENTION

The present description will be directed in particular to elements forming part of, or cooperating more directly with, apparatus and method in accordance with the present invention. It is to be understood that elements not specifically shown or described may take various forms well known to those skilled in the art.

Figure 1:
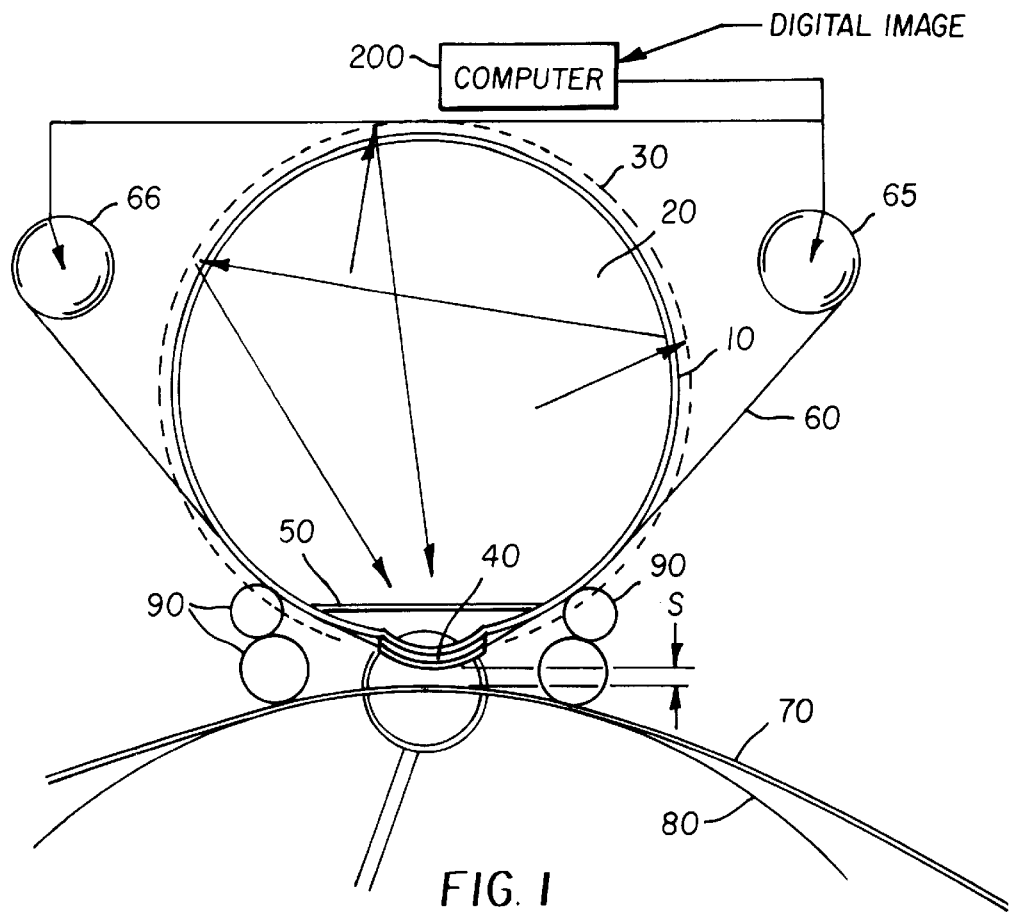
FIG. 1 is a diagram showing the printing apparatus from a side view.

Referring to FIG. 1, a printing apparatus 9 is shown. The apparatus includes a flash tube 10 having a quartz tube filled with an inert gas 20 such as argon, and fitted with tungsten electrodes at each end (not shown), so that discharge of a high voltage capacitor through the tube produces a short, intense flash of radiation, with a wide spectrum extending from the ultraviolet through the visible and into the infra-red portion of the electromagnetic spectrum. Such flash tubes are well known to those skilled in the art. To collect radiation emitted in directions off the printing axis, as indicated by the arrows in FIG. 1, the quartz tube is covered by a reflective material 30 such as silver except for a small opening at the bottom of the tube which is occupied by a linear array of liquid crystal cells 40. Also near the bottom of the flash tube, but above the linear array of liquid crystal cells is a first polarizer 50. When an electrical discharge is passed between the electrodes, the radiation produced will be reflected until it encounters the first polarizer 50, which polarizes the radiation by allowing only the radiation of the proper polarization to pass trough the polarizer. Radiation of the incorrect polarization will be absorbed or reflected from the polarizer 50. In this way, only polarized radiation passes through the liquid crystal cells. The liquid crystal cells are modulated by applying an electrical potential to each cell so the cell will change the polarization of the radiation passing through it. In essence, each cell will rotate the direction of polarization of the radiation depending on the amount of electrical potential, or voltage, applied to the cell. The radiation which passes through the liquid crystal cell then encounters a second polarizer, which will only pass radiation of the correct polarization. In essence, the second polarizer will pass different intensities of radiation depending on the polarization of the radiation. Radiation that passes the second polarizer illuminates the colorant donor 60. The colorant donor contains a transferable colorant and a radiation absorber. It may be possible for a single molecule to render both these functions, or separate molecules may be required, depending on the color of the printed image. The heat generated by the absorption of the radiation causes the colorant to transfer from the colorant donor 60 across the space indicated by the arrows "s" to the receiver 70 which is held against a platen 80. Mechanical means, indicated by rollers 90, may be used to accurately maintain the space "s". Alternatively, a sensor and actuator may be used to maintain the space against variations in the thickness of the donor and/or receiver. The colorant donor 60 is provided by a supply roll 66 and collected by a take up roll 65, both of which are controlled in a well known manner by a computer 200 as shown in FIG. 1. A digital image is applied to the computer 200 which modulates the liquid crystal cells 40 as will be discussed in connection with FIG. 5. The receiver 70 is similarly provided and may be collected or cut and ejected from a the apparatus by a similar mechanism that is not shown.

Figure 2:
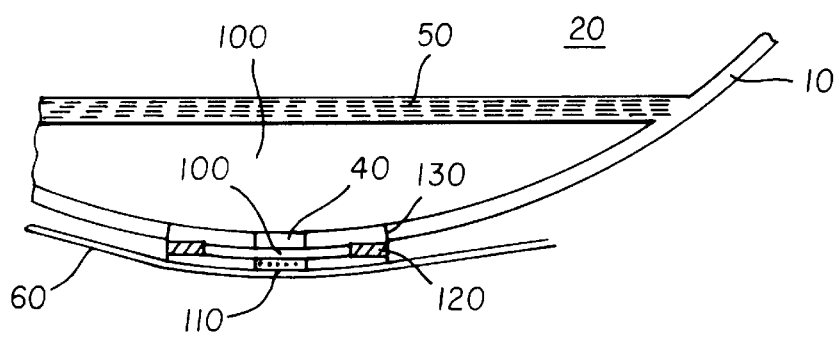
FIG. 2 is an enlarged view of the liquid crystal modulator portion of FIG. 1 shown under the magnifying glass of FIG. 1.

FIG. 2 shows an enlarged view of the liquid crystal cells 40 of FIG. 1. The second polarizer 110 is shown separated from the liquid crystal cells 40 by a small insulating gap 100 maintained by spacers 120. This is to reduce heating of the liquid crystal cell by the radiation which is absorbed by the second polarizer 110. Also shown are electrical conductors 130 which conduct the electrical potential to modulate the liquid crystal cells 40 under the control of computer 200. These are more fully described in FIG. 5.

FIG. 3 shows a microlens array useful in a second embodiment of the invention. In this embodiment of the invention, the radiation passing through the second polarizer is collected by an array of microlenses 140 which may correspond to in number to the number of liquid crystal cells. The radiation is thus focused down to a smaller, higher intensity, area 150 (also indicated by the arrows "l") than is the case in the first embodiment of the invention. The consequence of a smaller spot means that a line of printed spots will not connect, and therefore a dark density area of an image cannot be accurately printed with a single line of spots. This is why FIG. 2 shows an array of microlenses corresponding to an array of liquid crystal cells. The adjacent microlens and cell are slightly offset from the first microlens and cell in a direction orthogonal to the printing direction indicated by the arrow "X". The time of printing the offset cells is controlled, or delayed, so that dots from each of the 4 columns in FIG. 2 print on the same line in a connected manner, thus allowing accurate rendition of high density areas of a scene.

FIG. 4 shows a cross-sectional view of a line of microlenses taken through the line 4—4 of FIG. 3. The radiation, indicated by the arrows, is collected and focused by the microlens 140 to the area indicated by the arrows "l".

Figure 5:
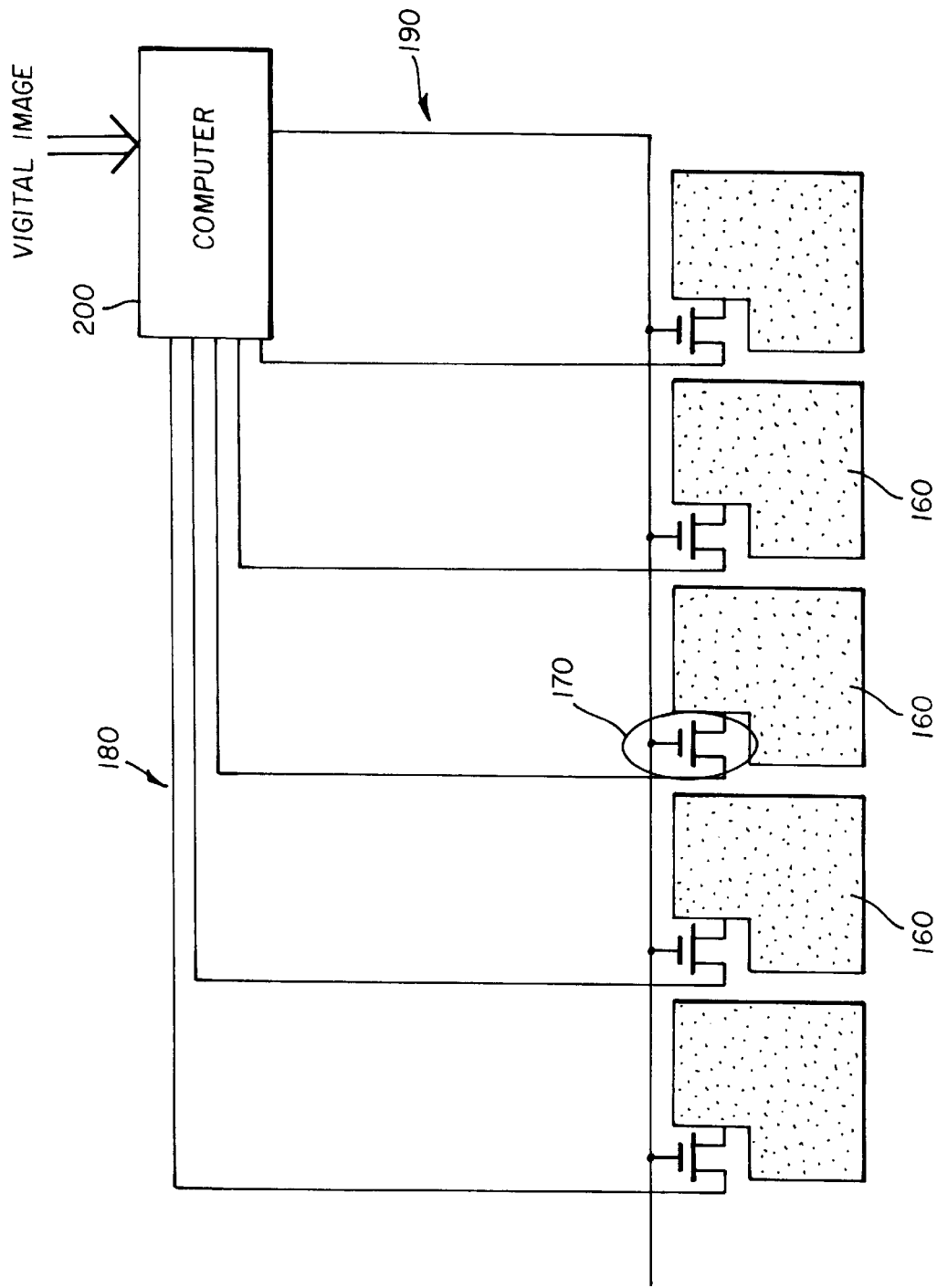
FIG. 5 is a close-up top view of the liquid crystal modulator showing the electrical connections.

FIG. 5 shows an enlarged top view of a portion of the line of liquid crystal cells. The shaded area 160 represents the conductive area which is charged with electrical potential, or voltage, through the transistor represented within the circled area 170. The shaded area 160 can be thought of as the drain of the transistor. The source of the transistor is the column electrical conductors 180 which are controlled by the computer 200 as shown. The row electrical conductors 190, also controlled by the computer 200 as shown, are connected to the gate of the transistor. When the gate is energized, only those cells where the source is also energized will become charged. By controlling the time the source is energized, partial charging of the liquid crystal cell can be controlled, resulting is partial rotation of polarization and partial transmission of radiation from the flash, and partial transfer of dye from the donor to the receiver. In this way continuous tone images can be printed.

The invention has been described in detail with particular reference to certain preferred embodiments thereof, but it will be understood that variations and modifications can be effected within the spirit and scope of the invention.

PARTS LIST 10 flash tube
20 inert gas
30 reflective material
40 liquid crystal cells
50 first polarizer
60 colorant donor
65 take up roll
66 supply roll
70 receiver
80 platen
90 rollers
100 insulating gap
110 second polarizer
120 spacers
130 electrical conductors
140 microlenses
150 focus area
160 conductive area
170 transistor
180 column electrical conductors
190 row electrical conductors
200 computer

What is claimed is:

1. Printing apparatus for radiation thermal transfer of colorant from a donor to a receiver, comprising:
   a) a flash tube for emitting high intensity radiation;
   b) a polarizer for receiving high intensity radiation from the flash tube and polarizing such radiation;
   c) liquid crystal cells disposed to receive polarized radiation from the polarizer;
   d) means for modulating the liquid crystal cells so that they change the polarization of the radiation passing through them;
   e) a second polarizer for receiving radiation from the liquid crystal cells and arranged to pass different intensities of radiation depending on their polarization; and
   f) means for positioning the colorant donor relative to the receiver in colorant transfer relationship with the second polarizer at a colorant transfer position so that radiation which passes through the second polarizer illuminates the colorant donor so that colorant is transferred to the receiver.

2. The apparatus of claim 1 wherein the modulating means changes the polarization of radiation to vary the amount of radiation that will pass through the second polarizer to the donor thereby varying the amount of colorant transferred to the receiver.

3. The apparatus of claim 1 wherein the liquid crystal cells are arranged to cause the illumination of a line at a time of the donor at the colorant transfer position.

4. The apparatus of claim 3 further including means for moving the donor and the receiver to position the donor and receiver at the colorant transfer position relative to the second polarizer.

5. The apparatus of claim 3 wherein the moving means positions the donor and receiver to be spaced so as to define a gap between the receiver and donor at the colorant transfer position.

6. The apparatus of claim 5 further including means responsive to the thickness changes in either the donor or the receiver to adjust the position of the receiver relative to the donor so as to maintain the gap between the receiver and donor.

7. Printing apparatus for radiation thermal transfer of colorant from a donor to a receiver, comprising:

a) a flash tube for emitting high intensity radiation;
   b) a polarizer for receiving high intensity radiation from the flash tube and polarizing such radiation;
   c) liquid crystal cells disposed to receive polarized radiation from the polarizer;
   d) means for modulating the liquid crystal cells so that they change the polarization of the radiation passing through them;
   e) a second polarizer for receiving radiation from the liquid crystal cells and arranged to pass different intensities of radiation depending on their polarization; and
   f) means for positioning the colorant donor in an engaging relationship with the flash tube and the second polarizer including means for moving the donor relative to the receiver to the colorant transfer position so that colorant is transferred to the receiver.

8. Printing apparatus for radiation thermal transfer of colorant from a donor to a receiver, comprising:

a) a flash tube for emitting high intensity radiation;
   b) a polarizer for receiving high intensity radiation from the flash tube and polarizing such radiation;
   c) liquid crystal cells disposed to receive polarized radiation from the polarizer;
   d) means for modulating the liquid crystal cells so that they change the polarization of the radiation passing through them;
   e) a second polarizer for receiving radiation from the liquid crystal cells and arranged to pass different intensities of radiation depending on their polarization;
   f) a plurality of microlenses disposed to receive radiation from the second polarizer; and
   g) means for positioning the colorant donor and the receiver in colorant transfer relationship with the plurality of microlenses at a colorant transfer position so that radiation from the microlenses which passes through the second polarizer illuminates the colorant donor so that colorant is transferred to the receiver.

* * * * *